(12) United States Patent
Bessone et al.

(10) Patent No.: US 12,533,618 B2
(45) Date of Patent: Jan. 27, 2026

(54) FILTER ELEMENT AND FILTER SYSTEM COMPRISING SAME

(71) Applicant: Donaldson Company, Inc., Bloomington, MN (US)

(72) Inventors: Sebastien Bessone, Asnières-sur-seine (FR); Farid Ladimat, Sartrouville (FR); Francois-Xavier Beherec, Paris (FR); Raphael Ribot, Boulogne-Billancourt (FR)

(73) Assignee: Donaldson Company, Inc., Bloomington, MN (US)

( * ) Notice: Subject to any disclaimer, the term of this patent is extended or adjusted under 35 U.S.C. 154(b) by 481 days.

(21) Appl. No.: 18/008,792

(22) PCT Filed: Jun. 3, 2021

(86) PCT No.: PCT/US2021/035640
§ 371 (c)(1),
(2) Date: Dec. 7, 2022

(87) PCT Pub. No.: WO2021/252258
PCT Pub. Date: Dec. 16, 2021

(65) Prior Publication Data
US 2023/0226481 A1     Jul. 20, 2023

(30) Foreign Application Priority Data
Jun. 10, 2020   (EP) ..................................... 20179400

(51) Int. Cl.
*B01D 46/00* (2022.01)
*B01D 46/10* (2006.01)
*B01D 46/42* (2006.01)

(52) U.S. Cl.
CPC ..... *B01D 46/4227* (2013.01); *B01D 46/0006* (2013.01); *B01D 46/10* (2013.01); *B01D 2265/028* (2013.01)

(58) Field of Classification Search
CPC .......... B01D 46/4227; B01D 46/0006; B01D 46/10; B01D 2265/028; B01D 46/0005;
(Continued)

(56) References Cited

U.S. PATENT DOCUMENTS 3,093,401 A * 6/1963 Hagendoorn ........... F24F 13/28
292/207
5,868,478 A    2/1999 Yemini
(Continued)

FOREIGN PATENT DOCUMENTS

DE    102017007497    2/2019
FR    2 741 568       5/1997
(Continued)

OTHER PUBLICATIONS

International Patent Application No. PCT/US2021/035640 filed Jun. 3, 2021, PCT International Search Report and Written Opinion issued Aug. 25, 2021, 10 pages.

*Primary Examiner* — Jennifer Dieterle
*Assistant Examiner* — Qianping He
(74) *Attorney, Agent, or Firm* — Mueting Raasch Group

(57) ABSTRACT

A filter element configured to be installed by sliding said filter element into a filter housing cavity along a first direction, said filter element comprising a handlebar pivotable around a pivoting axis perpendicular to said first direction; wherein said handlebar has a gripping portion on a first side of said axis and a latching portion on a second side of said axis, said second side being opposite said first side; and wherein said latching portion is configured to enter into engagement with at least one locking groove of said
(Continued)

filter housing when said gripping portion is moved into a first direction (A) and to disengage from said engagement when said gripping portion is moved into a second direction (B).

19 Claims, 4 Drawing Sheets

(58) Field of Classification Search
CPC .......... B01D 46/0004; B01D 2265/024; B01D 2265/025; B60H 2003/065; B60H 1/00521; B60H 2001/00621; F24F 13/28; F02M 35/02416; F02M 35/0203; E05B 2015/1692; Y10S 55/31; Y10T 292/089; Y10T 292/0872
USPC .......................................................... 55/357
See application file for complete search history.

(56) References Cited

U.S. PATENT DOCUMENTS

| | | | |
|---|---|---|---|
| 2009/0271950 A1 | 11/2009 | Wang | |
| 2020/0269174 A1* | 8/2020 | Schumacher | ........ B01D 46/521 |

FOREIGN PATENT DOCUMENTS

| | | | | |
|---|---|---|---|---|
| FR | 2741568 A1 * | 5/1997 | ......... | B01D 46/0004 |
| GB | 155221 | 10/1921 | | |
| KR | 10-1619895 | 5/2016 | | |

* cited by examiner

FILTER ELEMENT AND FILTER SYSTEM COMPRISING SAME

CROSS REFERENCE TO RELATED APPLICATIONS

This application is the § 371 U.S. National Stage of International Application No. PCT/US2021/035640, filed 3 Jun. 2021, which claims the benefit of priority under 35 U.S.C. § 119 of EP Application Serial No. 20179400.5, filed 10 Jun. 2020, the disclosures of which are incorporated by reference herein in their entireties.

FIELD OF THE INVENTION

The present invention pertains to the field of filtering system, in particular filtering systems comprising a filter element installed by sliding it into a filter housing cavity.

BACKGROUND

It is known to provide filter elements that are installed in a cavity of a filter housing by sliding them inside, much like a drawer is slid into a chest of drawers. In environments where the orientation of the system, the presence of vibrations or other mechanical perturbations, or any other factors create a risk of the filter element sliding back out after installation, it is known to provide a mechanism to lock the filter element in its place after installation.

US patent application publication no. US 2009/0271950 A1 discloses a handle structure with locking unit that includes a handle having a hollow fitting section provided at a predetermined position, a locking unit movably coupled with the handle, and an elastic element fitted around the rod section and restricted within the fitting section. The locking unit includes a rod section fitted in the fitting section of the handle, an operating section located at an end of the rod section to outward protrude from a first end of the fitting section, and a threaded section located at another end of the rod section to outward protrude from a second end of the fitting section. An annular stop section is formed around the rod section to interfere with the fitting section. When a slidable carrier unit with the handle structure mounted thereto is in a fully inward pushed position, the operating section may be turned to lock or unlock the carrier unit.

U.S. Pat. No. 5,868,478 discloses a combined handle-securing arrangement for unsecuring and opening a drawer in a cabinet and for closing and securing the drawer in the cabinet by a single action, and a drawer-cabinet including the combined handle-securing arrangement. The combined handle-securing arrangement including (a) a substantially L-shaped element having a first arm and a second arm being connected therebetween to form the substantially L-shaped element, the first arm being disposed substantially along a frontal face of the drawer, the second arm being disposable above the drawer, the L-shaped element being hingedly attachable to the drawer via a hinge, the hinge being located about a connection region of the first and second arms, the second arm being formed with a securing mechanism for accommodating an edge element of the cabinet; and (b) a spring element being connected to the second arm of the L-shaped element, the spring element being disposable against a contra element being connected to the drawer, such that when the drawer is closed the spring element forces together the edge element of the cabinet and the securing mechanism of the second arm, thereby securing the drawer closed, whereas when a user pulls the first arm away from the face of the drawer against a force imposed by the spring element, the L-shaped element rotates about the hinge, so as to separate the edge element of the cabinet and the securing mechanism of the second arm, thereby the drawer may become unsecured and concomitantly openable.

In the prior art, locking or unlocking of the filter element or drawer is achieved by turning an element around an axis parallel with the direction along which the element or drawer slides in the housing. This thus requires an additional manipulation by the operator during installation or removal.

It is an object of embodiments of the present invention to facilitate the locking and unlocking of a filter element during installation and removal, respectively.

SUMMARY OF THE INVENTION

According to an aspect of the invention, there is provided a filter element configured to be installed by sliding said filter element into a filter housing cavity along a first direction, said filter element comprising a handlebar pivotable around a pivoting axis perpendicular to said first direction; wherein said handlebar has a gripping portion on a first side of said axis and a latching portion on a second side of said axis, said second side being opposite said first side; and wherein said latching portion is configured to enter into engagement with at least one locking groove of said filter housing when said gripping portion is moved into a first direction and to disengage from said engagement when said gripping portion is moved into a second direction.

It is an advantage of the present invention that the filter element can be locked or unlocked in the filter housing cavity by pivoting the handlebar, which is a very natural movement for the operator as the handlebar is already being manipulated to push or pull the filter element.

In an embodiment of the filter element according to the present invention, the gripping portion has a part shaped to engage with a hook of said housing adjacent to said filter housing cavity.

It is an advantage of this embodiment that upon completion of the insertion, the filter element is securely fastened by engagement with the housing both at the locking groove (typically situated laterally) and the hook (typically situated centrally).

In an embodiment of the filter element according to the present invention, the handlebar is formed as a bent cylindrical rod or wire, at least one straight portion of which is guided through guiding means affixed to a front surface of said filter element, said guiding means being arranged along said pivoting axis.

The inventors have found that this is a particularly efficient and economical manner to implement both the latching portion and the part shaped to engage with the hook.

In a particular embodiment, two portions of said handlebar are guided through respective guiding means affixed to said front surface of said filter element, wherein said gripping portion is formed by a central part of said handlebar situated between said two guiding means, and wherein said latching portion is formed by extremities of said handlebar situated outside of said two guiding means.

The inventors have found that this is a particularly efficient and economical manner to implement both the latching portion and the part shaped to engage with the hook in such a way as to firmly secure the filter element in the housing upon installation.

According to an aspect of the present invention, there is provided a filter system comprising a filter element as described above, and a filter housing having a filter housing cavity configured to receive said filter element and at least one locking groove configured to engage with said latching portion of said filter element.

The technical effects and advantages of embodiments of the filter system according to the present invention correspond, mutatis mutandis, to those of the corresponding embodiments of the filter element according to the present invention.

BRIEF DESCRIPTION OF THE FIGURES

These and other features and advantages of embodiments of the present invention will now be described in more detail with reference to the accompanying drawings, in which.

DETAILED DESCRIPTION OF EMBODIMENTS

Figure 1:
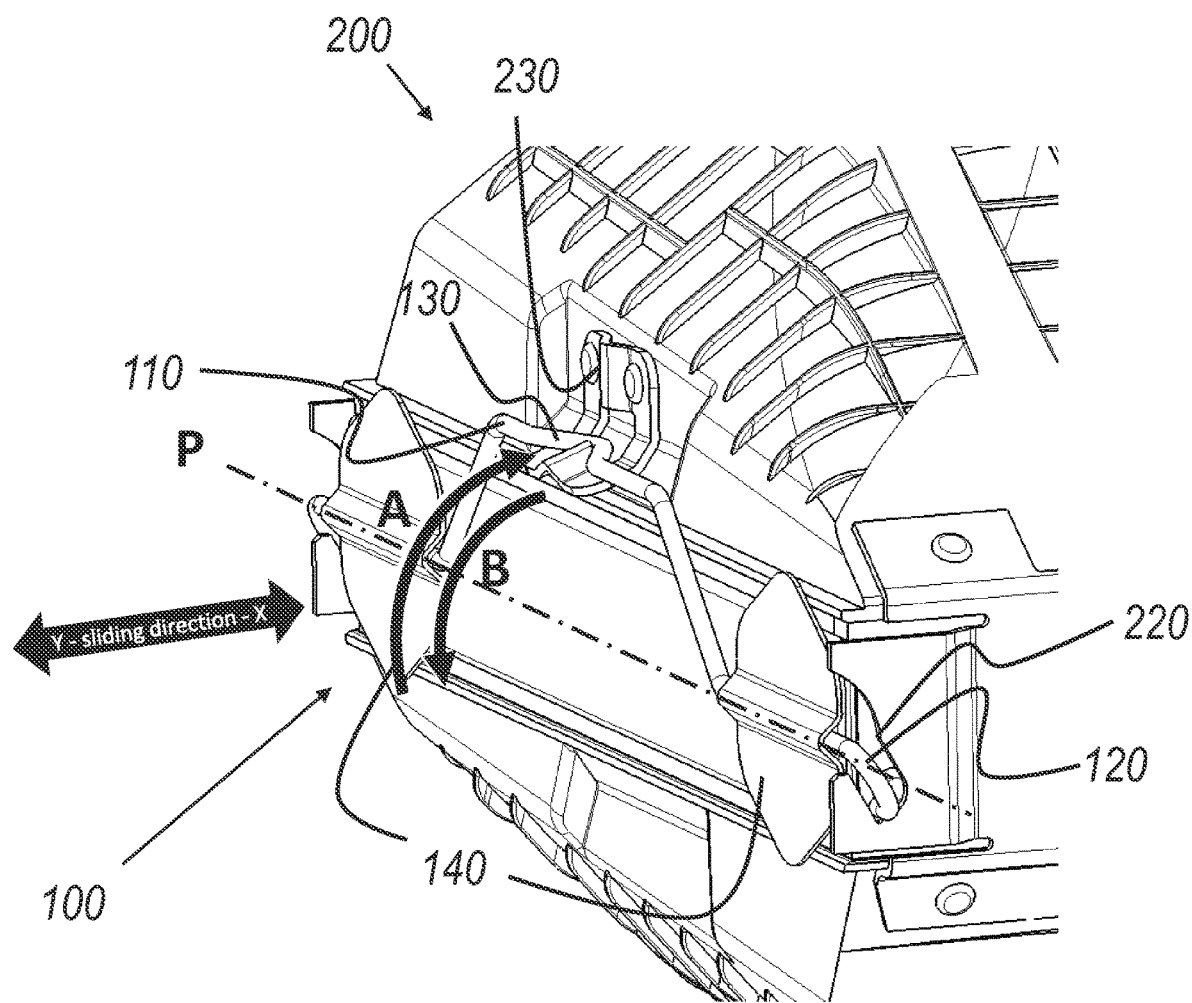
FIG. 1 is a perspective drawing of a first embodiment of the filter system according to the present invention.

FIG. 1 illustrates a filter element 100 according to a first embodiment of the present invention, configured to be installed by sliding said filter element into a filter housing cavity. The filter element 100 and the housing 200 combine to form an embodiment of the filter system according to the present invention. The direction of sliding the filter element into or out of the filter housing cavity will hereinafter be referred to as the "first direction" or the "sliding direction". The sliding direction is indicated in the Figures with a black two-point arrow, whereby the direction of sliding the filter element 100 into the housing 200 is marked as X and the direction of taking the filter element 100 out of the housing is marked as Y.

The tray-shaped filter element typically includes a filter medium arranged to be traversed by air flowing between an inlet and an outlet of the filter system (not illustrated in FIG. 1). In the illustrated orientation, the general direction of air flow through the filter medium, between a dirty side and a clean side, would be vertical. By way of non-limiting examples, the filter medium can consist of pleated media, fluted media, non-woven material, and the like.

The filter element comprises a handlebar 110, 120 pivotable around a pivoting axis P perpendicular to the sliding direction. Without loss of generality, the illustrated filter element slides in a horizontal plane and its handlebar 110, 120 pivots around a horizontal axis P perpendicular to the sliding direction, i.e. so as to cause the operator-facing portion 110 to move up and down. The skilled person will appreciate that the principles of the invention equally apply to a handlebar pivoting around a vertical axis perpendicular to the sliding direction, i.e. so as to cause the operator-facing portion to move left and right, or to a filter element sliding in a completely differently oriented plane.

The handlebar has a gripping portion 110 on a first side of the axis P and a latching portion 120 on a second side of the axis P. The second side is opposite the first side. More specifically, the gripping portion 110 is at the operator-facing side of the filter element 100 and the latching portion 120 faces away from the operator (in the illustrated case, it is more particularly situated at the housing-facing side of a front surface of the filter element).

The latching portion 120 is configured to enter into engagement with at least one locking groove 220 of said filter housing 200 when the gripping portion 120 is moved into a first direction A and to disengage from said engagement when the gripping portion 120 is moved into a second direction B.

Preferably, the handlebar 110, 120 is arranged in such a way that when the filter element 100 is pushed into the filter housing cavity (sliding in direction X), the force exerted on the gripping portion 110 of the handlebar to push the filter element 100 in is in the correct direction to pivot the handlebar into the locked position when the filter element 100 is fully inserted. Conversely, pulling on the gripping portion 110 of the handlebar when the filter element 100 is inserted will pivot it in the direction to unlock the assembly, whereupon further pulling will remove the filter element 100 from the filter housing cavity (sliding in direction Y).

In the embodiment illustrated in FIG. 1, the locking grooves 220 of the housing 200 define a path sloping downwards from the operator-facing opening, which mechanically links a sliding movement of the filter element 100 in the sliding direction X/Y to a pivoting movement of the handlebar in the rotation direction A/B.

During the installation of the filter element 100, this mechanical link operates as follows. When the latching portion 120 of the handlebar (in the illustrated case, the lateral extremities of the rod that forms the handlebar) enters the operator-facing opening of the groove 220 and the filter element 100 is pushed further into the filter housing cavity (sliding direction X), the shape of the groove 220 forces the handlebar to pivot (rotation A) so as to move the gripping portion 110 upwards. Likewise, if the gripping portion 110 of the handlebar is pushed upwards at this stage, causing the handlebar to pivot (rotation A), the shape of the groove 220 will aid in moving the filter element 100 into the filter housing cavity (sliding direction X), whereby the point of contact between the latching portion 120 and the groove 220 acts as the fulcrum for leveraging the force exerted onto the gripping portion 120.

During the removal of the filter element 100, the mechanical link operates as follows. When the gripping portion 110 of the handlebar is pulled downwards, causing the handlebar to pivot (rotation B), the shape of the groove 220 will aid in moving the filter element 100 out of the filter housing cavity (sliding direction Y), whereby the point of contact between the latching portion 120 and the groove 220 acts as the fulcrum for leveraging the force exerted onto the gripping portion 120. Likewise, when the filter element 100 is pulled further out of the filter housing cavity (sliding direction Y), the shape of the groove 220 forces the handlebar to pivot (rotation B) so as to move the gripping portion 110 downwards, until the latching portion 120 of the handlebar exits the operator-facing opening of the groove 220.

In view of the repeated frictional contact between the latching portion 120 of the handlebar and the groove 220 of the housing, the latching portion 120 may be provided with a suitable coating or cladding that reduces friction, thus protecting the surfaces of the elements that it contacts, ensuring a smoother insertion/removal operation and eliminating potential frictional noises.

In the illustrated embodiment, the handlebar 110, 120 is formed as a bent cylindrical rod or wire, preferably made of metal. Two straight portions of the handlebar are guided through respective guiding means 140 affixed to the front surface of the filter element 100, wherein said gripping portion 110 is formed by a central part of said handlebar situated between said two guiding means 140, and wherein said latching portion 120 is formed by extremities of said handlebar situated outside of said two guiding means 140. The guiding means are arranged along said pivoting axis P.

In the illustrated example, the guiding means 140 take the form of "knuckles", i.e. plates attached to the front panel of the filter element 100 and shaped so as to leave a cylindrical or semi-cylindrical channel between the front panel and the plates through which the handlebar can pass, with sufficient play to allow easy rotation. Preferably, the plates are made of metal. The plates 140 may be spot-welded to the front panel of the filter element 100 or attached in any other suitable manner.

The skilled reader will appreciate that the arrangement described above presents a non-limiting example of a way to attach the handlebar to the filter element 100. In a more general way, at least one straight portion of the handlebar is guided through guiding means affixed to a front surface of said filter element, the guiding means being arranged along said pivoting axis.

Preferably, the handlebar, in particular the gripping portion 120, has a part 130 shaped to engage with a hook 230 of the housing adjacent to said filter housing cavity. The term "hook" is used to denote any structure which can participate in a releasable engagement with the handlebar when the handlebar is pushed onto it, including without limitation a simple hook, a plurality of hooks, a pair of elastic jaws, and the like. The hook and or the handlebar should exhibit sufficient elasticity to allow the releasable engagement to be established (the handlebar should be allowed to "snap" into place by overcoming an appropriate elastic force) and to be released again by manual force alone.

In view of the repeated frictional contact between the part 130 shaped to engage with the hook 230 and the hook 230, the part 130 may be provided with a suitable coating or cladding that reduces friction, thus protecting the surfaces of the elements that it contacts, ensuring a smoother insertion/removal operation, and eliminating potential frictional noises.

Figure 2:
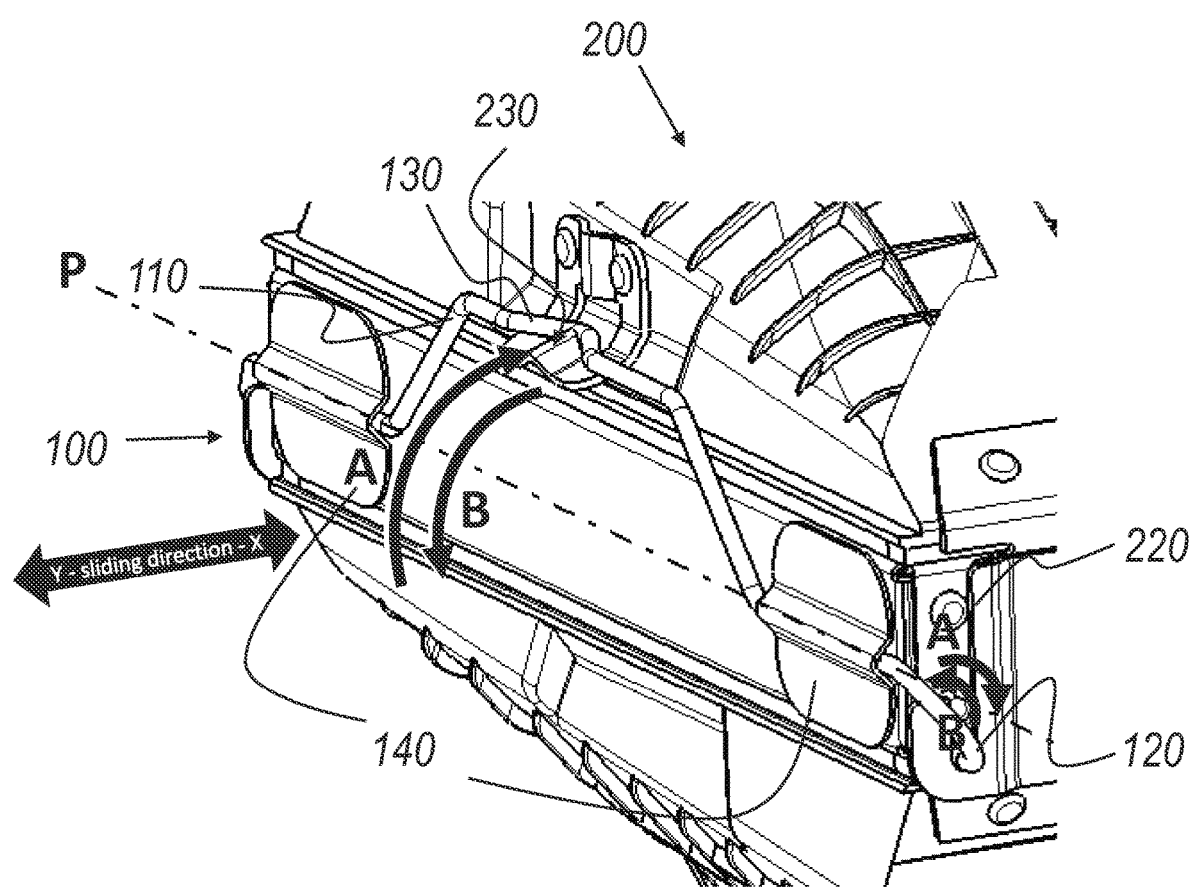
FIGS. 2-4 are perspective drawings of a second embodiment of the filter system according to the present invention, in different stages of engagement between the filter element and the housing.
Figure 3:
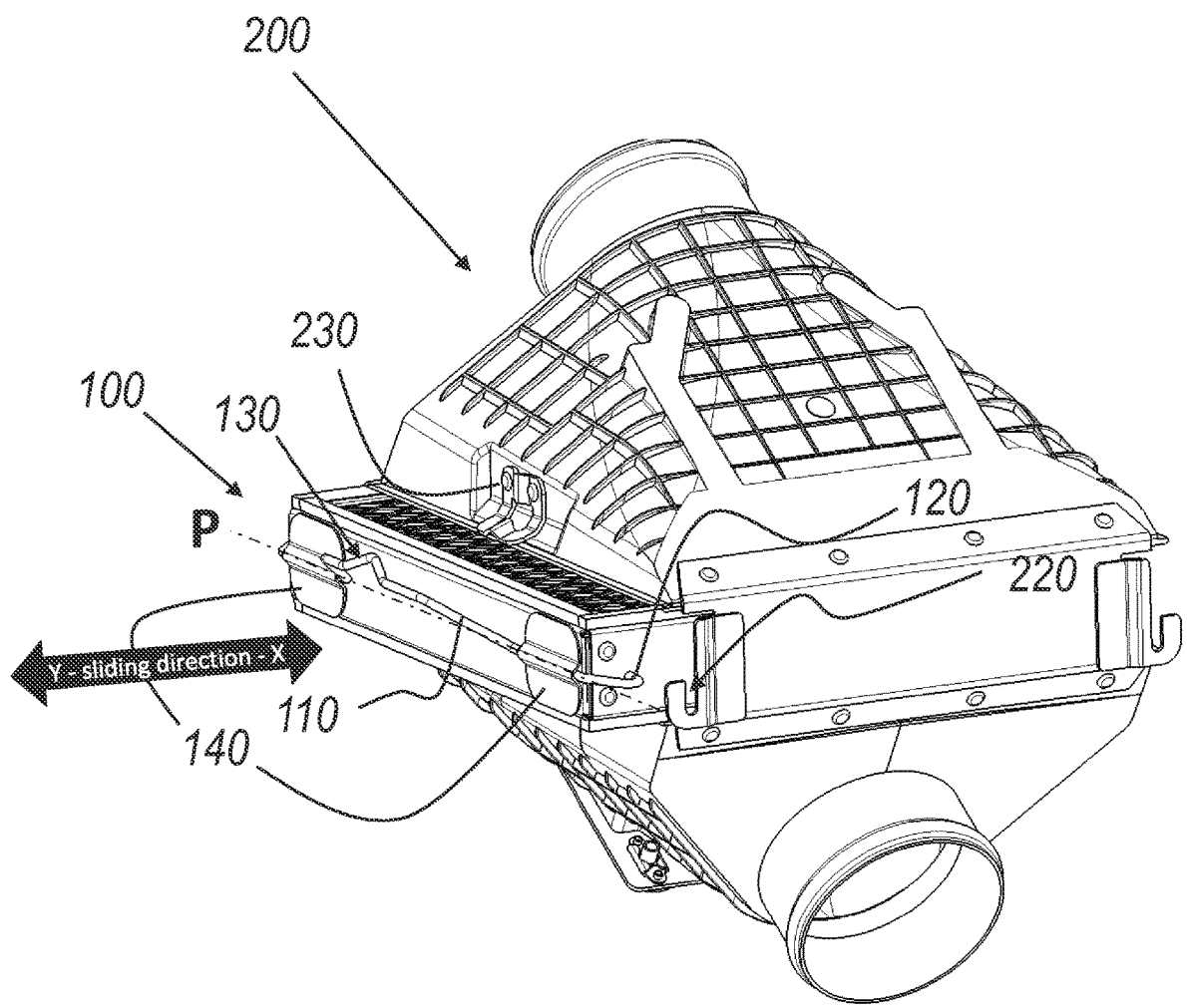
Figure 4:
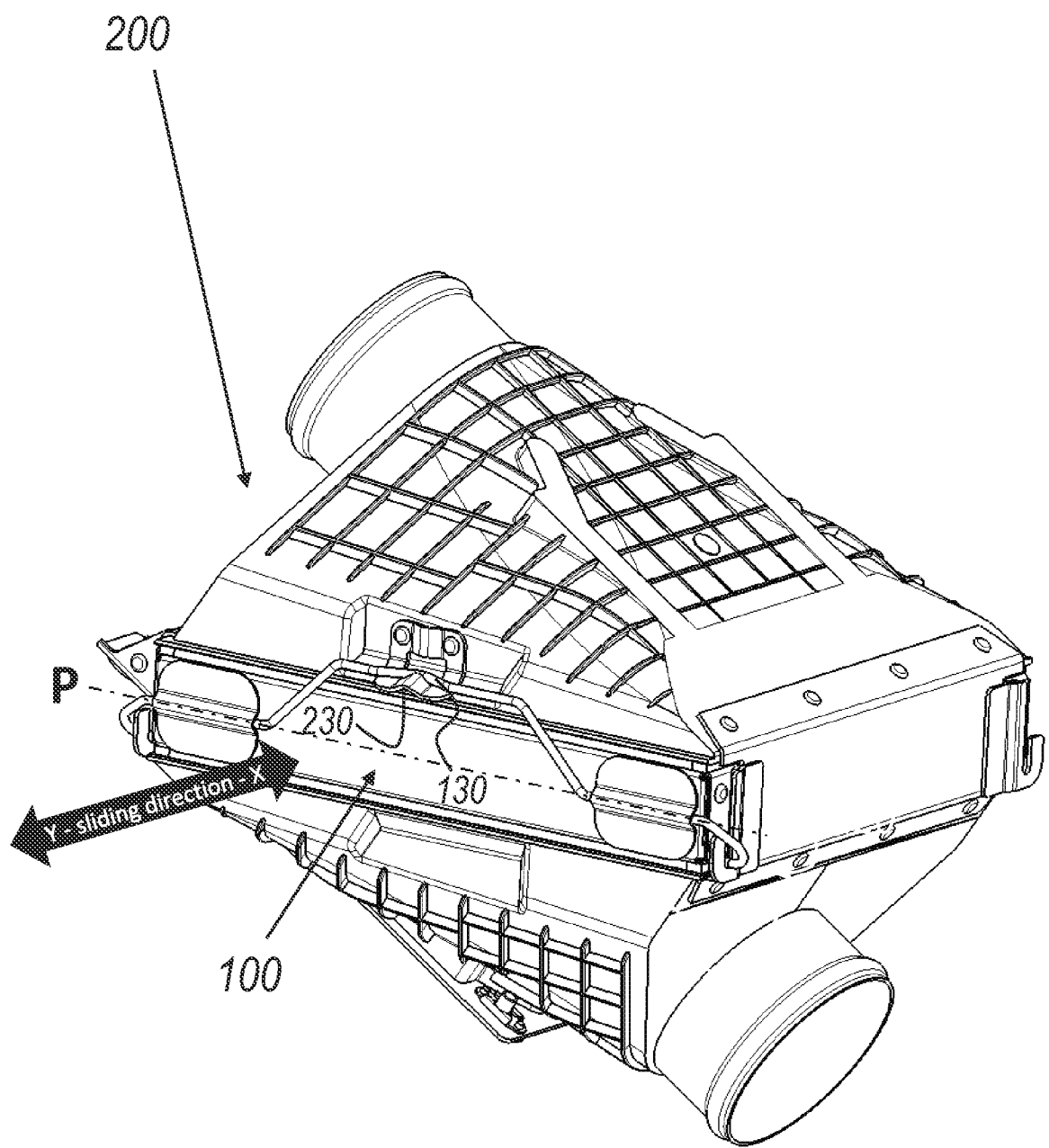

FIGS. 2-4 illustrate a second embodiment of the filter element and of the corresponding filter system according to the present invention.

In the illustrated non-limiting example, the tray-shaped filter element is generally rectangular. An inlet and an outlet of the filter system are shown on opposing sides of the filter element, when installed. In the illustrated orientation, the general direction of air flow through the filter medium, between a dirty side and a clean side, would be vertical.

In FIGS. 2-4, elements corresponding to those described above in the context of FIG. 1 have been labeled with the same reference numerals. Unless indicated otherwise hereinbelow, these elements operate in the same manner and are subject to the same options as described in the context of FIG. 1.

FIG. 2 shows the latching portion 120 and the locking grooves 220 of the second embodiment in more detail. Contrary to the embodiment of FIG. 1, the locking grooves 220 of the second embodiment define a path going straight down (i.e. perpendicular to the sliding direction) from the operator-facing opening. When the latching portion 120 of the handlebar (again, in the illustrated case, the lateral extremities of the rod that forms the handlebar) enters the operator-facing opening of the groove 220 and the filter element 100 is pushed further into the filter housing cavity (sliding direction X), the shape of the groove 220 forces the handlebar to pivot (rotation A) so as to move the gripping portion 110 upwards. Likewise, if the gripping portion 110 of the handlebar is pushed upwards at this stage, causing the handlebar to pivot (rotation A), the shape of the groove 220 will aid in moving the filter element 100 into the filter housing cavity (sliding direction X), whereby the point of contact between the latching portion 120 and the groove 220 acts as the fulcrum for leveraging the force exerted onto the gripping portion 120.

During the removal of the filter element 100, the mechanical link operates as follows. When the gripping portion 110 of the handlebar is pulled downwards, causing the handlebar to pivot (rotation B), the shape of the groove 220 will aid in moving the filter element 100 out of the filter housing cavity (sliding direction Y), whereby the point of contact between the latching portion 120 and the groove 220 acts as the fulcrum for leveraging the force exerted onto the gripping portion 120. Likewise, when the filter element 100 is pulled further out of the filter housing cavity (sliding direction Y), the shape of the groove 220 forces the handlebar to pivot (rotation B) so as to move the gripping portion 110 downwards, until the latching portion 120 of the handlebar exits the operator-facing opening of the groove 220.

Compared to the first embodiment, the second embodiment will undergo a greater amount of travel in the sliding direction for a given amount of rotation of the handlebar about the pivoting axis P, giving the operator the feeling of a quicker installation operation.

FIG. 3 shows the filter element 100 and the complete housing 200 of the second embodiment in a disengaged position. At this stage, the handlebar can be used to move the filter element 100 further into or out of the housing 200 in either sliding direction X-Y. There is no need for any pivoting motion of the handlebar until the point where the latching portion 120 engages with the grooves 220.

FIG. 4 shows the filter element 100 and the complete housing 200 of the second embodiment in the fully engaged position. The gripping portion 110 has been rotated upwards about the pivoting axis P (rotation A) to the maximum possible extent as the latching portion 120 has reached the bottom of the groove 220. A specially shaped part 130 of the gripping portion 110 engages with a hook 230 of the housing 200, to releasably lock the handlebar in its final position, thereby securing the filter element 100 in its correct position inside the housing 200. The specially shaped part 130 may be designed to be able to snap over the hook 230 by virtue of the elasticity of the handlebar and/or the vertical play of the filter element 100 inside the housing 200 that is afforded by the elasticity of the gasket at the filter element/housing interface.

While the invention has been described hereinabove with reference to specific embodiments, this was done to clarify and not to limit the invention, the scope of which is defined by the accompanying claims.

The invention claimed is:

1. A filter element configured to be installed by sliding said filter element into a filter housing cavity along a first sliding direction, said filter element comprising a handlebar pivotable around a pivoting axis perpendicular to said first sliding direction;
   wherein said handlebar comprises a gripping portion on a first side of said pivoting axis and a latching portion on a second side of said pivoting axis, said second side being opposite said first side;
   wherein said handlebar comprises a bent cylindrical element, wherein a straight portion of the handlebar is guided through a guide affixed to a front surface of said filter element, said guide being arranged along said pivoting axis;
   and wherein said latching portion is configured to engage with a locking groove of a filter housing comprising said filter housing cavity when said gripping portion is moved in a first direction (A) and to disengage from said engagement with said locking groove when said gripping portion is moved in a second direction (B).

2. The filter element of claim 1, wherein said gripping portion comprises a part shaped to engage with a hook of said filter housing adjacent to said filter housing cavity.

3. The filter element of claim 1, wherein said handlebar comprises a first portion and a second portion and said guide comprises a first guide, wherein said gripping portion of the handlebar comprises a central portion of the handlebar located between the first portion and the second portion, wherein the first portion is positioned in the first guide and the second portion is positioned in a second guide affixed to said front surface of said filter element such that said gripping portion formed by said central portion of said handlebar situated between said first guide and said second guide, and wherein said latching portion is formed by extremities of said handlebar located outside of said first guide and said second guide.

4. The filter element of claim 1, wherein said pivoting axis is a horizontal axis.

5. The filter element of claim 1, wherein said pivoting axis is a vertical axis.

6. The filter element of claim 1, wherein said latching portion of said handlebar comprises at least one of a coating or cladding on a surface thereof.

7. The filter element of claim 2, wherein said part of said gripping portion comprises at least one of a coating or cladding on a surface thereof.

8. The filter element of claim 1, wherein said latching portion of said handlebar comprises at least one of a coating or cladding on a surface thereof.

9. A filter system comprising:
a filter element comprising a handlebar pivotable around a pivoting axis perpendicular to sliding direction, wherein said handlebar comprises a gripping portion on a first side of said pivoting axis and a latching portion on a second side of said pivoting axis, said second side being opposite said first side, wherein said filter element is configured to be installed into a filter housing cavity by sliding said filter element into said filter housing cavity along said sliding direction; and
a filter housing comprising said filter housing cavity and a locking groove configured to engage with said latching portion of said filter element;
wherein said handlebar comprises a bent cylindrical element, wherein a straight portion of the handlebar is guided through a guide affixed to a front surface of said filter element, said guide being arranged along said pivoting axis; and
wherein said latching portion is configured to engage with said locking groove of said filter housing when said gripping portion is moved in a first direction (A) and to disengage from said engagement with said locking groove when said gripping portion is moved in a second direction (B).

10. The filter system of claim 9, wherein said gripping portion has a part shaped to engage with a hook of said filter housing adjacent to said filter housing cavity.

11. The filter system of claim 9, wherein said handlebar comprises a first portion and a second portion and said guide comprises a first guide, wherein said gripping portion of the handlebar comprises a central portion of the handlebar located between the first portion and the second portion, wherein the first portion is positioned in the first guide and the second portion is positioned in a second guide affixed to said front surface of said filter element such that said gripping portion formed by said central portion of said handlebar situated between said first guide and said second guide, and wherein said latching portion is formed by extremities of said handlebar located outside of said first guide and said second guide.

12. The filter system of claim 9, wherein said pivoting axis is a horizontal axis.

13. The filter system of claim 9, wherein said pivoting axis is a vertical axis.

14. The filter system of claim 9, wherein said latching portion of said handlebar comprises at least one of a coating or cladding on a surface thereof.

15. The filter system of claim 10, wherein said part of said gripping portion comprises at least one of a coating or cladding on a surface thereof.

16. A filter system comprising:
a filter element comprising a handlebar pivotable around a pivoting axis perpendicular to a sliding direction, said handlebar comprising a gripping portion on a first side of said pivoting axis and a latching portion on a second side of said pivoting axis, said second side being opposite said first side; and
a filter housing comprising a filter housing cavity configured to receive said filter element and a locking groove configured to engage with said latching portion of said filter element, said filter element configured to be installed in said filter housing cavity by sliding said filter element into said filter housing cavity along said sliding direction;
wherein said gripping portion has a part shaped to engage with a hook of said filter housing adjacent to said filter housing cavity;
wherein said handlebar comprises a bent cylindrical element, wherein a straight portion of the handlebar is guided through a guide affixed to a front surface of said filter element, said guide being arranged along said pivoting axis;
wherein said handlebar comprises a first portion and a second portion and said guide comprises a first guide, wherein said gripping portion of the handlebar comprises a central portion of the handlebar located between the first portion and the second portion, wherein the first portion is positioned in the first guide and the second portion is positioned in a second guide affixed to said front surface of said filter element such that said gripping portion formed by said central portion of said handlebar situated between said first guide and said second guide, and wherein said latching portion is formed by extremities of said handlebar located outside of said first guide and said second guide; and
wherein said latching portion is configured to engage with said locking groove of said filter housing when said gripping portion is moved in a first direction (A) and to disengage from said engagement with said locking groove when said gripping portion is moved in a second direction (B).

17. The filter system of claim 16, wherein said pivoting axis is a horizontal axis.

18. The filter system of claim 16, wherein said pivoting axis is a vertical axis.

19. The filter system of claim 16, wherein said part of said gripping portion comprises at least one of a coating or cladding on a surface thereof.

* * * * *